Patented Dec. 12, 1950

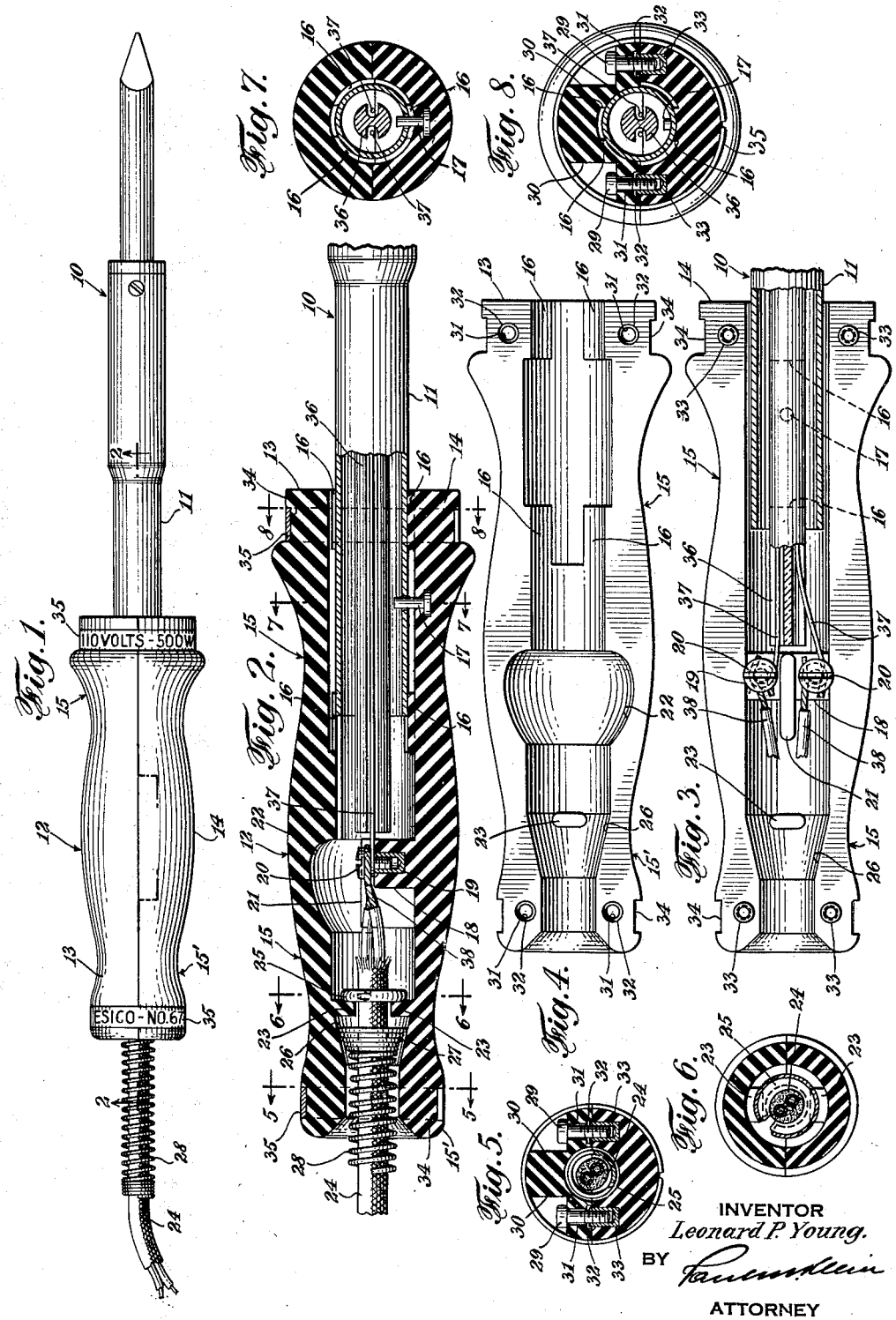

2,533,749

UNITED STATES PATENT OFFICE 2,533,749

SPLIT HANDLE FOR SOLDERING IRONS AND THE LIKE

Leonard P. Young, Chester, Conn.

Application October 18, 1946, Serial No. 704,190

4 Claims. (Cl. 174—46)

This invention relates to electric soldering irons generally, and especially to a handle for such soldering irons.

The prime objects of the present invention are the provision of a dielectric handle for soldering irons and the like which is relatively inexpensive and which is constructed of at least two component parts, which facilitates a ready association of the handle with the casing of an electric soldering iron, or its disassociation therefrom, and also renders easier the assembly of electric soldering iron units, particularly as to the insertion, possible replacement and electrical connection of the heating element and of the electric cord leading thereto.

A further object of this invention is to provide a split handle construction for an electric soldering iron, wherein is provided a fixed terminal post equipped with suitable attaching means for the terminal ends of both the heating element and of the electric cord leading thereto, and wherein the possibility of twisting of either the element leads or of the cord ends is definitely minimized or fully prevented, whereby that usual cause of "shorts" is practically eliminated.

Another object of this invention is to provide a split handle construction, wherein the two parts composing the handle are provided with internally threaded inserts, grommets or bushings, imbedded in the material of one part of the handle and projecting at one end partially above that part, while the corresponding handle part is provided with suitable recesses or depressions for the reception of the extending ends of the inserts, whereby the two handle parts are caused to readily register with one another.

A further object of this invention is to provide within the handle parts means for relieving the strain upon the cord, due to pulling action. These strain relieving means are in the form of cooperating extensions or shoulders sufficiently distanced to permit the passage between them of the cord body, but serving as stops for a clip or clamp tightly associated with that cord end from which extend its terminals attached in fixed position to the terminal post within one of the handle parts, the opposite handle part being provided with a recess in registry with and forming a cover for the terminal post.

Another feature of the present invention resides in the formation within the handle parts of a plurality of spaced supporting faces for the casing of an electric soldering iron and the provision of a detent within one of the parts, which detent is embedded in the handle material and extends into the casing body through a corresponding aperture provided in the latter for the purpose of preventing twisting or any other movement of the casing relative to the handle.

A still further object of the present invention is to provide a split handle construction for electric soldering irons composed of two substantially cylindrical or annular cooperating parts, having means for bringing these parts into registry with one another, and means for detachably connecting them, and wherein angular recesses are provided at both ends of one of the handle parts for the reception of such connecting means, and wherein at both ends of the connected handle parts are provided peripheral, substantially annular recesses adapted for the reception of resilient strips designed to not only cover said connecting means, but to bear informative legends relating to the device equipped with the split handle.

The foregoing and other objects and advantages of the present invention will become more fully apparent from the ensuing description, in connection with the accompanying drawings, the latter, while forming an important part of this disclosure, being by no means intended in a limiting sense, and wherein:

Fig. 1 illustrates an electric soldering iron structure equipped with a split handle, in accordance with the present invention;

Fig. 2 is a vertical cross section through the handle end of the soldering iron taken on line 2—2 of Fig. 1;

Fig. 3 is a plan view of one, the lower handle part;

Fig. 4 is a plan view of the other co-acting upper handle part;

Fig. 5 is a section taken on line 5—5 of Fig. 2;

Fig. 6 is a section taken on line 6—6 of Fig. 2;

Fig. 7 is a section taken on line 7—7 of Fig. 2; and

Fig. 8 is a section taken on line 8—8 of Fig. 2.

Referring now specifically to the different figures, numeral 10 denotes an electric soldering iron structure having a casing 11 adapted to be secured to and supported within a handle 12. The handle is composed of semi-annular parts, that is an upper part 13 and a lower part 14, preferably made of dielectric material, and both of which handle parts having what may be termed a casing-receiving end 15 and a cord housing end 15'. In the casing-receiving end of the handle there are provided spaced elevations or casing engaging lugs 16, the interior, semi-cylindrically curved surfaces of which correspond to the contour of casing 11, and which surfaces are adapted to clamp about the casing for frictionally engaging the latter. In lower portion 14 of the handle is imbedded a detent 17, disposed centrally between and projecting above the casing engaging surfaces of lugs 16 and being adapted to extend into a suitable aperture provided in casing 11, as clearly seen in Figs. 2, 7 and 8. Detent 17 prevents the movement of the casing relative to the handle.

Between the casing-engaging portion 15 and the cord housing portion 15' of the lower handle part there is provided a bridge formation 18 constituting a terminal post support, in which latter are imbedded internally threaded bushings 19 (see Fig. 2), for the reception of terminal attaching screws 20. Between the two terminal screws there is provided a partition 21, extending above bridge formation 18, and electrically separating the terminal attaching screws 20.

Corresponding in position to terminal post or bridge 18 there is arranged in the upper handle portion 13 a suitable recess 22, providing sufficient space for accommodating the terminal ends of both the heating element and of the cord.

Within the cord housing portion of both handle parts there are provided cooperating projections 23, which serve as abutment for either a knot made in electric cord 24, not shown, or a friction member 25 clamped tightly around the cord as seen in Figs. 2, 5 and 6. Such knot or friction member associated with the cord is intended, in cooperation with projections 23, to prevent dislocation of the cord by a pulling movement exerted thereagainst. Projections 23 are sufficiently spaced from each other to permit passage between them of the cord body.

In the left-hand end portion of the two handle parts there is provided a conical recess 26 for the reception of a similarly shaped end 27 of a spring cord guard 28.

The two handle parts are detachably secured with one another by means of screws 29 (Figs. 5 and 8), for the reception of the heads of which there are provided angular recesses 30 in the upper handle member. The bodies of the screws pass through apertures 31, the interior ends of which are enlarged into recesses 32. These recesses are designed for the reception of the upper ends of internally threaded inserts or bushings 33 imbedded in the material of the lower handle part. The upper ends of these bushings, in cooperation with recesses 32 of the upper handle part, facilitate the proper registry of the two handle portions before being secured together by screws 29 passing into bushings 33. At both ends of the handle structure there are provided in each handle part semi-circular recesses 34, which, when the handle parts are connected, form continuous, annular channels. These channels serve for the reception of resilient annular bands 35 which are snapped into place over the end flanges adjacent to the channels. The bands preferably bear suitable legends denoting the origin of and other data relating to the device.

In the usual construction of electric soldering irons there is employed in the casing a dielectric member 36 for guiding and insulating leads 37 extending from the heating element of the device, not shown.

In heretofore employed soldering iron structures these element leads are associated with the electric cord by passing the cord through the handle, connecting the terminals of the element with the terminals of the cord and pulling the cord and the casing back into place within the handle, and securing the casing thereto, usually by screws. In consequence of such terminal connection it is quite common that during the use of the device the electric cord supplying current to the element is often twisted to such an extend that its insulation wears or breaks, thus causing "shorts." In the present construction the twisting of either the cord or the leads from the element is practically eliminated. As will be seen from Fig. 3 both the leads 37 from the heating element as well as the terminal ends 38 from the cord are attached in fixed position within the handle body by screws 20 in engagement with bushings 19. Casing 11 being prevented from turning or moving in respect to the handle body assures the retention of the element leads in their originally attached position. Similarly stop member 25 engaging the cord and bearing against projections 23, extending towards one another from both handle parts, assure the retention of electric cord 24 in its originally placed position, in which position the cord terminals will remain even during accidental twisting of the cord, since they are electrically separated by partition 21 of terminal bridge 18.

Inasmuch as all parts of the electric soldering iron structure and the electric cord may be fully assembled in one part of the handle, prior to attaching thereto the other handle part, both the original assembly as well as replacement of any parts of the structure or of the cord is greatly facilitated, and therefore the advantage of having a split handle construction of the type illustrated and described for electric soldering irons or similar devices becomes readily apparent.

While in the foregoing only a specific construction of the instant device has been disclosed, changes and improvements therein may be readily incorporated within the broad scope of the present invention, without departing from the spirit of the annexed claims.

I claim:

1. A split handle for the reception of electric iron casings and the like, said handle comprising two component parts having interlocking means for facilitating their registry with one another, both parts having a casing-engaging end and cord housing end, said casing-engaging end being provided with spaced casing supporting surfaces and a fixed detent disposed centrally between and projecting above said spaced surfaces and into the casing interior; the cord housing end having oppositely disposed projections adapted to serve as stop means for limiting the outward movement of the cord, terminal support in one of the handle parts and being located between the casing engaging end and the cord housing end of that handle part and having a pair of terminal attaching means for securing thereto the terminals both of a heating element and of a cord, a recess in the other handle part opposite said pair of terminal attaching means, and a partition separating the latter and projecting into said recess.

2. A split handle for the casings of electric soldering iron structures or the like, which comprises two component parts provided with cooperating screw-receiving projections and recesses for keeping the handle parts in registry with one another and having spaced means for supporting and engaging such casing, detent means between the spaced supporting means for preventing movement of such casing relative to the handle, means for arresting the outward movement of an electric supply cord normally extending from the handle, a pair of spaced, fixed terminal attaching means for the terminal of both a heating element and of such cord in one of the handle parts, and a partition between said terminal attaching means, said partition projecting into the other handle part.

3. In a handle for the reception of the end of a casing forming a part of an electric soldering iron or the like, two component, interlockable hollow parts, both having casing-receiving and supply cord housing ends, the casing-receiving end being provided with a plurality of spaced casing-engaging and supporting faces, one of the hollow handle parts having a detent element adapted to extend into the casing body for preventing its movement relative to the handle; the cord end of both handle parts having oppositely disposed, cooperating projections adapted to prevent an outward movement of the cord when the latter is subjected to a pulling action; a fixed terminal attaching post, having a separating element, arranged in the one handle part, a recess provided opposite said attaching post in the other handle part; internally threaded inserts imbedded in the one handle part and partly projecting therefrom, the other handle part having screw-receiving holes and recesses, the latter corresponding to, registering with and serving for accommodating the projecting ends of said inserts; circumferential recesses at both ends of the handle parts, and screw-covering, annular strips held in said circumferential recesses.

4. In a handle for electric soldering iron structures, two component, interlockable hollow parts, each constituting substantially one half portion of the handle, both of the parts having internal, spaced contact faces for accommodating and holding the casing of the iron structure, one of the parts having a detent adapted to extend into the body of the casing for preventing its movement relative to the handle; a fixed terminal post having a central partition, forming an integral portion of one handle part, while a depression is provided opposite that post in the other handle part, the partition separating the terminals of the post; both handle parts having oppositely disposed, cooperating stop means for the electric cord; internally threaded inserts imbedded in the material of one of the handle parts and partly projecting therefrom; corresponding screw-receiving apertures and aligned insert-receiving recesses provided in the other handle part, screws engaging said inserts, annular recesses arranged at both ends of the handle, and screw-covering resilient bands sprung into said annular handle recesses.

LEONARD P. YOUNG.

REFERENCES CITED

The following references are of record in the file of this patent:

UNITED STATES PATENTS

| Number | Name | Date |
|---|---|---|
| 1,446,653 | Murphy | Feb. 27, 1923 |
| 1,659,911 | Fay | Feb. 21, 1928 |
| 1,988,827 | Bennett | Jan. 22, 1935 |
| 2,128,883 | Burt | Aug. 30, 1938 |
| 2,224,583 | Abbott | Dec. 10, 1940 |
| 2,224,585 | Abbott | Dec. 10, 1940 |
| 2,286,952 | Cannon et al. | June 16, 1942 |
| 2,410,618 | Zelov | Nov. 5, 1946 |